April 5, 1927.
W. F. MOTTIER
HAYRAKE
Filed Oct. 2, 1923
1,623,062
2 Sheets-Sheet 2
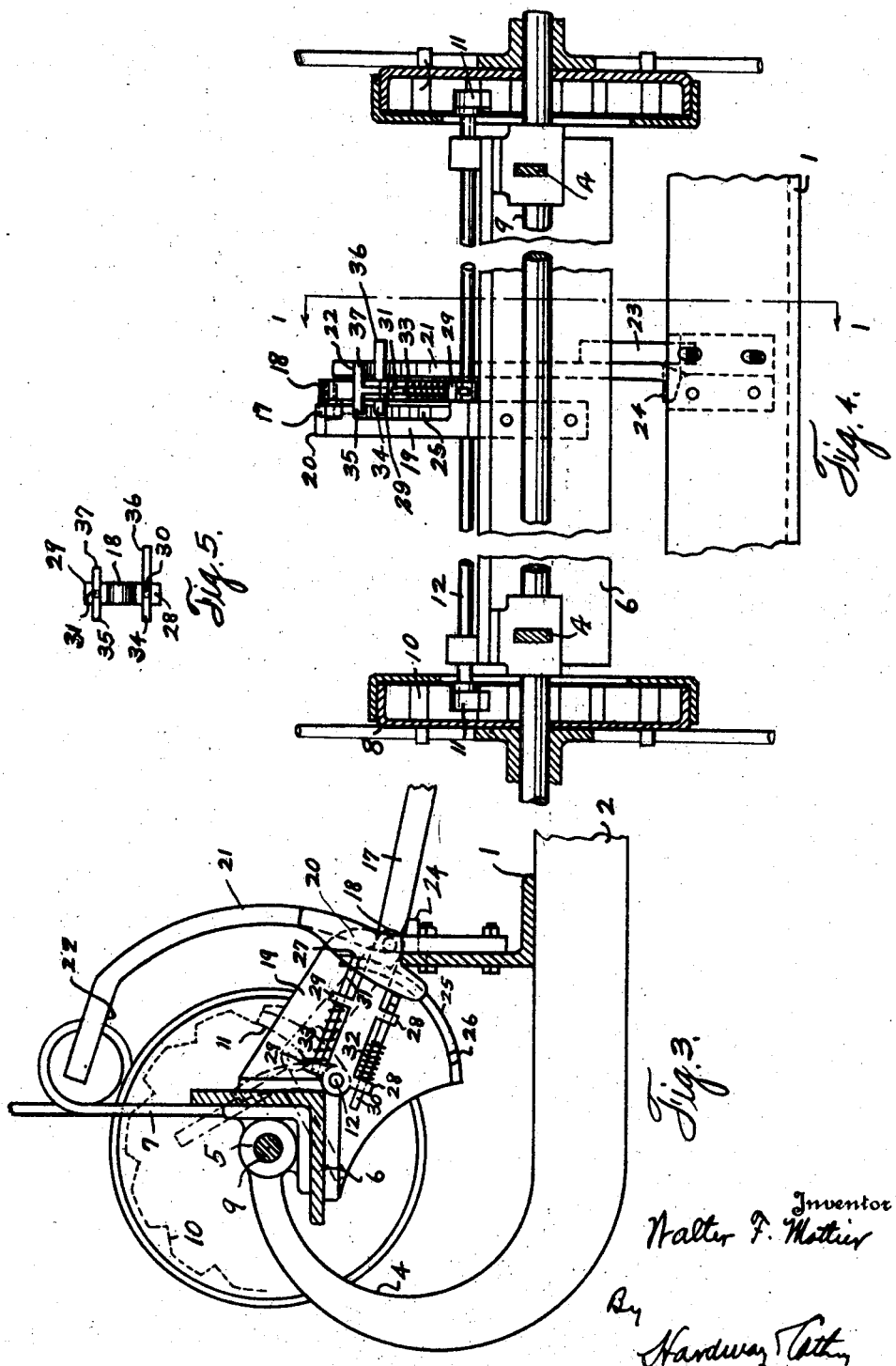

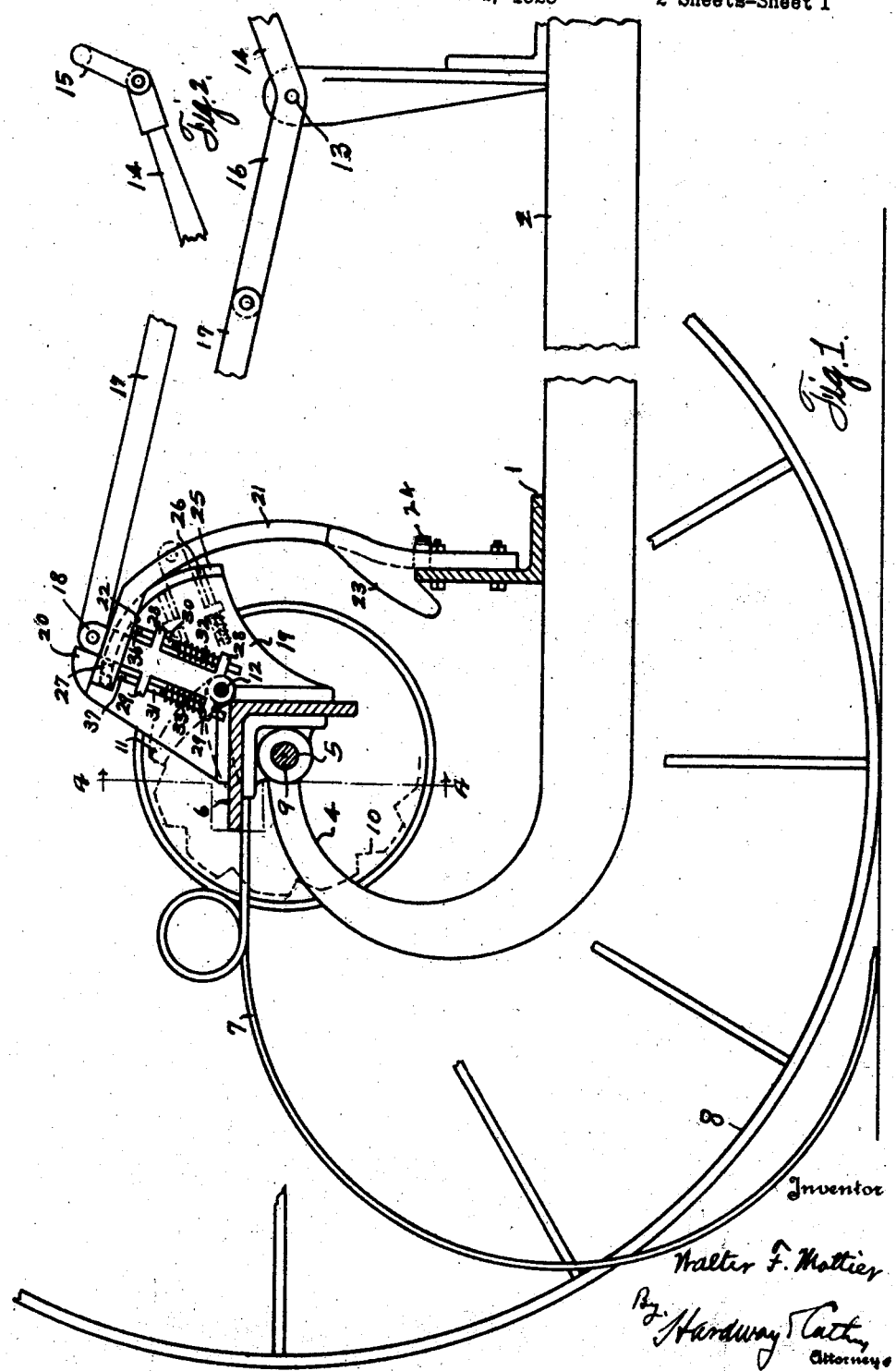

Patented Apr. 5, 1927.

1,623,062

UNITED STATES PATENT OFFICE.

WALTER F. MOTTIER, OF EL CAMPO, TEXAS.

HAYRAKE.

Application filed October 2, 1923. Serial No. 666,055.

This invention relates to new and useful improvements in a hay rake, and has particular relation to a machine constructed for the purpose of raking hay, alfalfa and the like.

One object of the invention is to provide a machine of the character described having a novel and improved means for controlling the dumping movements of the rake.
Another object of the invention is to simplify the operation of the machine by the use of controlling means which may be adapted to different makes of hay rakes, and in this connection it should be understood that the invention relates primarily to a means for controlling the movements of the rake proper, and also for positively locking the rake head in or out of engagement with the wheels, rather than to the machine in its entirety.

With the above and other objects in view, the invention has particular relation to certain novel features of construction, operation and arrangement of parts, an example of which is given in this specification and illustrated in the accompanying drawings, wherein:—

Figure 1 shows a fragmentary longitudinal, vertical, sectional view of the rake shown in raking position, taken on the line 1—1 of Figure 4.

Figure 2 shows a fragmentary side view of a controlling lever employed.

Figure 3 shows a fragmentary longitudinal, vertical, sectional view of the rake showing the mechanism in dumping position, also taken on the line 1—1 of Figure 4.

Figure 4 shows a fragmentary rear view of the rake partly in section taken on the line 4—4 of Fig. 1; and, Figure 5 shows an end view of an operating arm employed.

Referring now more particularly to the drawings, wherein like numerals of reference designate similar parts in each of the figures, the numeral 1 refers to the main frame to which thills, as 2, are attached for draft purposes.

Extending rearwardly from the frame are the arms, as 4, only one being shown, said arms being so formed as to provide a pivotal mounting, as at 5, for the angle bar 6 which serves as a head to which the rake teeth 7 are secured. The arrangement of these parts is such that the rake teeth will lie close to the ground, as shown in Figure 1.

For the purpose of manually operating the rake teeth, a connection is arranged between the rake head and the wheels 8 which support the axle 9, and upon which the machine travels. These wheels are mounted for rotation at opposite ends of the rake head, and each is formed with an inside ratchet 10 which may engage dogs 11 secured to the outer ends of the rod 12, which is pivotally mounted on the rake head. Normally these dogs remain disengaged from the corresponding ratchets, but they are required to engage therewith when the rod 12 is moved for this purpose. It will be noted that the rod 12 is eccentric with respect to the wheels 8, so that engagement of the dogs with the ratchets will necessarily result in locking the rake head to the wheels for movement therewith. The rake teeth will thereby be raised through a predetermined distance, and the dogs are again released from engaging position.

The general construction above described, is in common use. In effect it provides simply a lock between the rake head and wheels, so that the teeth will be properly raised to dumping position. The specific means heretofore known for actuating the dogs into and out of engaging position, relative to the ratchet teeth, have not, however, been entirely satisfactory owing to the uncertainty of their operation and the difficult lever manipulations that they have necessitated. In this form of rake specific provision has been made for positively locking the dogs in either position, that is, in engagement with the ratchet teeth, or in released position therefrom. It is with this phase of the mechanism that my invention is primarily concerned. The parts hereinafter described represent novel and distinct improvements over the actuating means and the actuating means commonly used and which I have above referred to; and include also said novel means of locking said dogs in either engaged or released position.

Pivotally mounted upon the frame of the machine, as at 13, is a lever 14 which is preferably operated by foot and may be equipped with a suitable strap or stirrup 15 for facilitating both push and pull movements. The lower end of this lever has a rigid arm 16, to the free end of which one end of the link 17 is pivoted and the other end of this link is pivoted to the free end of the arm 18 which is rigidly secured to the dog rod 12. Fastened to the rake head and lying adjacent said arm there is a plate 19 whose upper end has at its rear side a projecting shoulder 20 in alignment with the rear end of the link 17; and fastened to the frame 1, and upstanding therefrom, there is an arcuate support 21. This support lies adjacent the arm 18 opposite the plate 19 and its upper end has the cam face 22 on its underside. Adjacent the lower end of the support 21 and on the opposite side thereof from the arm 18, there is a cam 23 which has a stop 24 formed integrally therewith. This cam and stop are adjustable vertically on the frame and by the adjustment of said stop the range of travel of the rake teeth may be varied. This variation is necessary by reason of the fact that when raking short hay, or similar material, it is not necessary to elevate the teeth so far in dumping as when raking longer material such as cane, Kaffir corn and the like.

The plate 19 has an overturned arcuate flange 25 adjacent the arm 18, which is provided with the end notches 26 and 27, said notches being spaced a suitable distance apart. The arm 18 has the lateral bearings 28, 28, and 29, 29, spaced apart and formed integrally with said arm, and slidably mounted in the bearings are the rods 30, 31, which are seated on the respective springs 32, 33, which surround the corresponding rods and are attached at their outer ends to said rods and at their other ends rest against the corresponding bearings 28, 29. The outer ends of the rods have the overturned dogs 34, 35, toward the plate 19 and opposite them the bearing lugs 36 and 37.

The rake teeth are in raking position, as shown in Figure 1 and while in this position the arm 16 is in a straight line relation with the link 17, and the rear end of this link abuts against the shoulder 20 to take the strain of the load. The dog 35 is in alignment with the notch 27, but is held out of engagement therein by the cam face 22, and the dog 34 rides against the overturned flange 25. In order to now cause the rake to dump, a rearward pull is exerted on the lever 14, and this operates to swing the arm 18 forwardly into the position indicated in dotted lines in Figure 1, and the dog 34 will thereby be brought into alignment with, and will be engaged in, the notch 26, by the pressure of the spring 32. Meanwhile the rod 12 will be partially rotated and the free ends of the dogs 11 will be carried up into engaging relation with the ratchet teeth 10. The rake head and the appendants thereof will be thereby rotated forwardly by the wheels 8 into the position indicated in Figure 3, and the rake teeth will be elevated, thus dumping the load. While approaching the end of the dumping movement, the lug 36 will ride upon the cam 23 depressing the rod 30 and disengaging the dog 34 from the notch 26. This will unlock the arm 18 from the flange 25, and thereupon the free end of the arm 18 will contact with the stop 24, while in the position shown in dotted lines shown in Figure 3, and the further movement of the rake head with the wheels will carry the inner end of said arm on downwardly into the position indicated in full lines in Figure 3, thus causing partial, relatively backward rotation of the rod 12, thus disengaging the dogs 11, from the ratchet teeth 10. This will release the rake head and the weight of the teeth will move them back into raking position. During the dumping movement the dog 35 will ride off of the cam face 22 but will be out of alignment with its notch 27, and will ride against the inner side of the overturned flange 25. When the outer end of the arm 18 is stopped by the stop 24 and the rake head moves on thereafter to release the dogs 11, as above explained, the flange 25 will move on with the rake head bringing the notch 27 into alignment with the dog 35 which will be forced therein by the pressure of the spring 33 and this will lock the dogs 11 in released position out of engagement with the ratchet teeth 10. The rake head and teeth will then swing on around by gravity into raking position the parts assuming the position shown in Figure 1 and the dog 35 being released by the contact of the lugs 37 against the cam face 22.

What I claim is:

1. The combination with a self dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels, a securing device mounted on the rake head for positively securing said locking means in said locking position until the rake head has turned with the wheels through a predetermined distance.

2. The combination with a self dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels, a securing device on the rake head for securing said locking means in said locking position until the rake head has turned with the wheels through a predetermined distance, and means for thereafter automatically releasing said locking device.

3. The combination with a self dump hay rake having a frame, ground wheels, a rake head and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels and a dumping movement thereby imparted to said rake head, means associated with said member and adapted to release said locking means to permit return movement of said rake head, securing devices mounted on the head one for securing said locking means in said engaged position and the other for securing said locking means in released position during the return movement of the rake head.

4. The combination with a self dump hay rake having a frame, ground wheels, a rake head and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels and dumping movement thereby imparted to said rake head, means associated with said member and adapted to release said locking means to permit return movement of said rake head, locking dogs, yieldably mounted on the head for securing said locking means in said engaged and released positions respectively, and means carried by the frame and arranged to release said locking dogs alternately.

5. The combination with a self dump hay rake having a frame, ground wheels, a rake head and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and the wheels and a dumping movement thereby imparted to said rake head, means associated with said member and adapted to release said locking means to permit return movement of said rake head, a pair of securing devices mounted on the head for securing said locking means in said engaged and released positions respectively, and cam members carried by the frame and arranged to release said respective securing devices alternately.

6. The combination with a self dump hay rake having a frame, ground wheels, a rake head and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and wheels, a securing device for securing said locking connection until the rake head has turned with the wheels through a predetermined distance, an adjustable stop provided to vary the range of rotation of the rake head through which said member is actuated relative to the rake head to release said locking means to permit return of the rake head, a cam carried by said stop and arranged to release said securing device.

7. The combination with a self dump hay rake having a frame, ground wheels, a rake head, and means for locking the rake head to rotate with the wheels, of means for controlling the action of the locking means comprising a member having connection thereto and movably mounted on the rake head, means under the control of the operator for effecting an initial movement of said member whereby the locking connection is established between the rake head and wheels, a pair of securing devices, one securing said locking connection until the rake head has turned with the wheels through a predetermined distance, a member fixed to the frame and formed to release said locking means and said last mentioned securing device to permit return movement of the rake head, the other securing device being arranged to secure said locking means in released position upon return movement of the rake head, and means operating to release said last mentioned securing device at the end of said return movement.

8. The combination with a self dump hay rake having a frame and ground wheels, a rake head, a rod mounted to rock on the rake head, and dogs carried thereby, for locking the rake head to rotate with the wheels; of means for controlling the action of said dogs, and comprising an arm connected to said rod, a pivotally mounted lever formed with a rigid arm, and a link connecting the free ends of said arms; an abutment carried by the rake head, said lever arm and link when in alignment operating through said abutment to hold the rake head locked to the frame, said controlling means being effective to cause an initial movement of said rod whereby the locking connection is established between the rake head and wheels and a dumping movement thereby imparted to said head.

9. The combination with a self dump hay rake having a frame, and ground wheels, a rake head, a rod mounted to rock on the rake head, and locking dogs carried thereby for locking the rake head to rotate with the wheels; of means for controlling the action of said dogs, and comprising an arm connection to said rod, a pivotally mounted lever formed with a rigid arm, and a link connecting the free ends of said arms; an abutment carried by the rake head, said lever arm and link when in alignment operating through said abutment to hold the rake head locked to the frame, said controlling means being effective to cause an initial movement of said rod whereby the locking connection is established between the rake head and wheels and a dumping movement thereby imparted to said head, means for releasing said locking dogs to permit return movement of the rake head, a pair of securing devices, one securing said locking dogs in locking position with the rake head, said releasing means being fixed to the frame and formed to release said locking dogs and said last securing device to permit said return movement of the rake head, the other securing device being arranged to secure said locking dogs in released position upon return movement of the rake head, and means operating to release said last mentioned securing device at the end of said return movement.

10. The combination with a self dump hay rake having a frame, ground wheels, a rake head, means mounted on the rake head for locking said head to rotate with the wheels, said means including a rod and dogs carried thereby; of means for controlling the action of said locking means comprising a lever formed with a rigid arm, an arm fixed to said rod, a link connecting the free ends of said arms; an abutment carried by the rake head, and operating through said rigid arm and link, when in one position to lock the rake head to the frame, said controlling means being effective to cause an initial movement of said locking means whereby a locking connection is established between the rake head and the wheels, and a stop arranged to effect a reverse movement of the fixed arm to release the rake head to permit return movement thereof.

11. The combination with a self-dump hay rake having a frame, ground wheels, a rake head, and means for locking the rake head to turn with the wheels, of means for controlling the action of the locking means comprising a member having connection therewith and movably mounted upon the rake head, means under the control of the operator for effecting an initial movement of said member whereby the locking connection is established between the rake head and the wheels, said last mentioned means including a single lever and a single link connected to said lever and adapted to actuate said member, and other means carried by the frame acting positively to prevent return movement of the member until the rake head has rotated with the wheels through a predetermined distance.

In testimony whereof I have signed my name to this specification.

WALTER F. MOTTIER.